United States Patent
Hong et al.

(10) Patent No.: US 9,022,199 B2
(45) Date of Patent: May 5, 2015

(54) MACHINING MODULE

(75) Inventors: Ming-Wei Hong, New Taipei (TW); Chien-Ming Chang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 104 days.

(21) Appl. No.: 13/598,914

(22) Filed: Aug. 30, 2012

(65) Prior Publication Data

US 2013/0168204 A1 Jul. 4, 2013

(30) Foreign Application Priority Data

Dec. 28, 2011 (CN) .......................... 2011 1 0446538

(51) Int. Cl.
B65G 37/00 (2006.01)
B65G 21/20 (2006.01)
B29C 71/00 (2006.01)

(52) U.S. Cl.
CPC ............ *B65G 21/20* (2013.01); *B29C 71/0009* (2013.01)

(58) Field of Classification Search
USPC ............ 198/341.03, 341.07, 346, 358, 370.1, 198/606, 607; 425/88, 165
See application file for complete search history.

(56) References Cited

U.S. PATENT DOCUMENTS

| | | | |
|---|---|---|---|
| 4,073,558 A * | 2/1978 | Benda et al. ..................... 445/40 |
| 5,427,227 A | 6/1995 | Crandall et al. |
| 5,927,044 A * | 7/1999 | Lamb et al. ................ 52/745.19 |
| 6,874,735 B1 | 4/2005 | Audyli |
| 7,270,226 B2 * | 9/2007 | Ostrom ......................... 198/358 |
| 7,428,957 B2 * | 9/2008 | Schaefer .................... 198/345.1 |
| 7,943,201 B2 * | 5/2011 | Hendricks, Sr. ........... 427/421.1 |
| 8,119,051 B2 * | 2/2012 | Mydlack et al. .............. 264/275 |
| 2003/0138312 A1 * | 7/2003 | Watson et al. .............. 414/795.4 |
| 2004/0163928 A1 * | 8/2004 | Affaticati et al. ............. 198/357 |
| 2004/0200692 A1 * | 10/2004 | Tanaka .......................... 198/349 |
| 2007/0203612 A1 * | 8/2007 | Mileaf .......................... 700/216 |
| 2007/0292626 A1 * | 12/2007 | Larsson et al. ................ 427/424 |
| 2008/0017476 A1 * | 1/2008 | Zeitler et al. ............. 198/370.01 |
| 2012/0305364 A1 * | 12/2012 | Morimoto et al. ....... 198/370.01 |

FOREIGN PATENT DOCUMENTS

CN 101247706 A 8/2008
CN 201529596 U 7/2010

* cited by examiner

*Primary Examiner* — Mark A Deuble
(74) *Attorney, Agent, or Firm* — Novak Druce Connolly Bove + Quigg LLP

(57) ABSTRACT

A machining module includes a molding system, a painting system and a transporting system. The transporting system is positioned between the molding system and the painting system. The transporting system automatically transports a plurality of blank members produced by the molding system to the painting system. The transporting system defines a detecting station for detecting the blank members and an assembly station for assembling the detected blank members to the painting system.

14 Claims, 2 Drawing Sheets

MACHINING MODULE

BACKGROUND

1. Technical Field

The present disclosure generally relates to machining modules, and particularly, to a machining module having a molding system and a painting system.

2. Description of the Related Art

A product machining process, such as a machining process of an electronic device housing, is generally divided into steps, such as molding and painting. Therefore, the workshops of a factory are designed to be molding workshops and painting workshops. A plurality of molding machines are positioned in the molding workshops, and the molding machines mold a plurality of electronic device housings. The electronic device housings are transported to the painting workshops by transport vehicles, and then the electronic device housings are positioned on the painting lines by hand. However, because the molding workshops and the painting workshops are separated from each other, the electronic device housings need to be transported between the molding workshops and the painting workshops, thereby decreasing production efficiency of the electronic device housings. Furthermore, because the transport vehicles enter the painting workshops frequently, a dust-free level of the painting workshops is decreased, thereby reducing the painting quality of the electronic device housings.

Therefore, there is room for improvement within the art.

BRIEF DESCRIPTION OF THE DRAWING

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
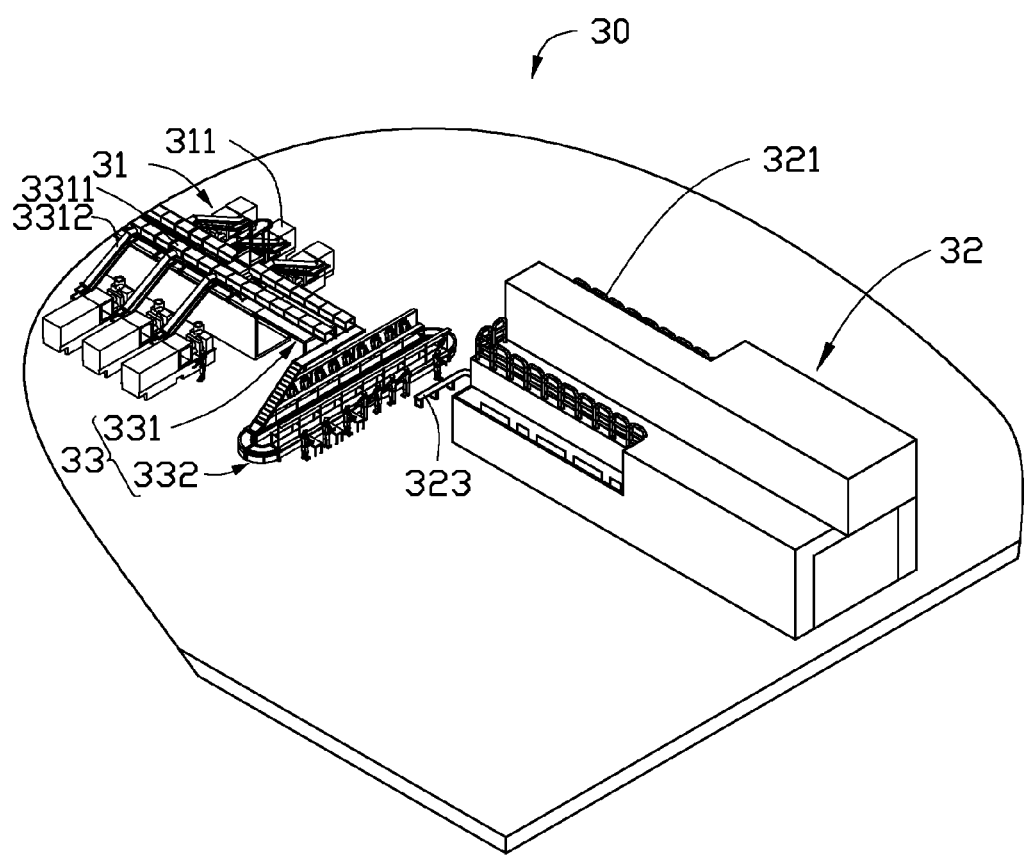
FIG. 1 is an isometric view of an embodiment of a machining module.

Referring to FIG. 1, an embodiment of a machining module 30 includes a molding system 31, a painting system 32, and a transporting system 33 positioned between the molding system 31 and the painting system 32.

Figure 2:
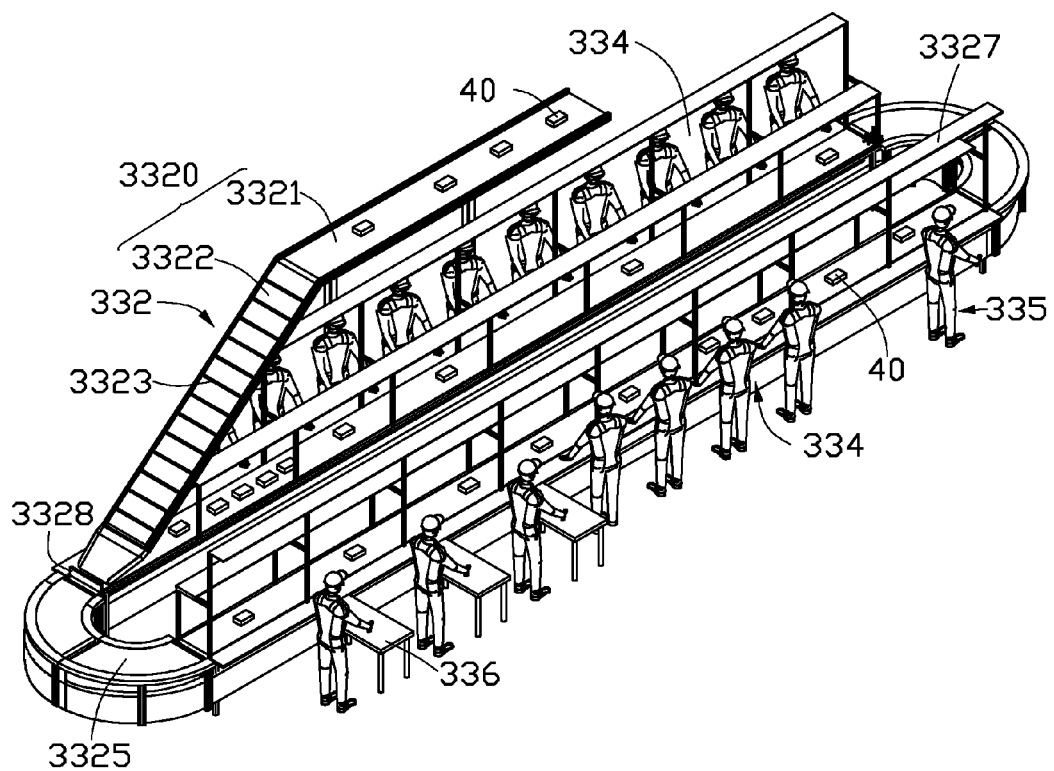
FIG. 2 is an isometric view of a second transporting section of the machining module of FIG. 1.

Referring also to FIG. 2, the molding system 31 includes a plurality of molding machines 311 for molding blank members 40. In the illustrated embodiment, the molding system 31 includes six molding machines 311 symmetrically arranged about a center line.

The painting system 32 includes a painting workshop 321, a plurality of painting machines (not shown) located in the painting workshop 321, and a feeding line 323 extending out of the painting workshop 321. The feeding line 323 has a plurality of assembly frames (not shown) for positioning the blank members 40.

The transporting system 33 includes a first transporting section 331 connected to the molding system 31 and a second transporting section 332 positioned adjacent to the painting system 32. The first transporting section 331 includes one or more main feeding belts 3311 and a plurality of branch feeding belts 3312 connected to the main feeding belt 3311. The main feeding belt 3311 is connected to the second transporting section 332, and the branch feeding belts 3312 are directly connected to the molding machines 311 for receiving and transporting the blank members 40. In the illustrated embodiment, the first transporting section 331 includes two main feeding belts 3311, and each of the main feeding belts 3311 is connected to three branch feeding belts 3312. In alternative embodiments, the number of the molding machines 311 and the branch feeding belts 3312 can be adjusted according to the number of the blank members 40 required to be produced.

The second transporting section 332 includes a feeding strip 3320 connected to the first transporting section 331, a loop transporting belt 3325 positioned at a bottom of the feeding strip 3320, and a support frame 3327 positioned on the loop transporting belt 3325. The feeding strip 3320 includes a horizontal strip portion 3321 and a sloping strip portion 3322 connected to an end of the horizontal strip portion 3321. The horizontal strip portion 3321 is connected to the main feeding belts 3311, and the sloping strip portion 3322 forms a plurality of friction bars 3323, thereby giving blank members 40 purchase on the sloping strip portion 3322 to avoid them sliding off. The loop transporting belt 3325 is substantially a ring in an oval shape, and defines a detecting station 334 for detecting the blank members 40, and an assembly station 335 for assembling the detected blank members 40 to the feeding line 323 of the painting system 32. The loop transporting belt 3325 further forms a blocking plate 3328 adjacent to a bottom end of the sloping strip portion 3322 to prevent the detected and the undetected blank members 40 being mixed together.

In the illustrated embodiment, the detecting station 334 includes a plurality of operators (not labeled) to detect the blank members 40, and the assembly station 335 has an operator to assemble the detected blank members 40 to the feeding line 323. In alternative embodiments, the operators may be replaced by a plurality of robots. The loop transporting belt 3325 further defines a wiping station 336 to clean the blank members 40. The support frame 3327 may be equipped with light sources to illuminate the second transporting section 332.

In use, the molding machines 311 mold a plurality of blank members 40, and the blank members 40 are transported to the main feeding belts 3311 by the branch feeding belts 3312. The main feeding belts 3311 transport the blank members 40 to the loop transporting belt 3325 through the feeding strip 3320. The blank members 40 on the loop transporting belt 3325 are moved in a counter-clockwise direction by the loop transporting belt 3325, therefore the blank members 40 are transported through the wiping station 336 first and then the detecting station 334. When the blank members 40 are transported to a portion of the loop transporting belt 3325 adjacent to the blocking plate 3328, the operator of the assembly station 335 transports the blank members 40 to the feeding line 323, and then the blank members 40 are transported into the painting system 32 for painting.

The need for separate transport vehicles to transport the blank members from the molding workshops to the painting workshops is avoided because the machining module 30 uses the transporting system 33 to transport the blank members 40 from the molding system 31 to the painting system 32. Therefore, efficiency of the machining efficiency of the blank members 40 is improved. Furthermore, the transporting system 33 and the molding system 31 being positioned outside of the painting system 32 means that no operators need to enter the painting system 32, and thus a dust-free atmosphere in the painting system 32 can be maintained, thereby improving the painting quality of the blank members 40.

In alternative embodiment, the feeding line 323 of the painting system 32 can be directly connected to the loop transporting belt 3325, and the machining efficiency of the blank members 40 would thus be further improved. The wiping station 336 may be omitted, the operators of the detecting station 334 can clean the blank members 40.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. A machining module, comprising:
a molding system for producing a plurality of blank members;
a painting system, and
a transporting system positioned between the molding system and the painting system;
wherein the transporting system transports the blank members from the molding system, the transporting system defines a detecting station for detecting the blank members and an assembly station for assembling the blank members, the blank members being assembled for transferring to the painting system, the transporting system comprises a first transporting section connected to the molding system and a second transporting section positioned adjacent to the painting system, the first transporting section comprises at least one main feeding belt and a plurality of branch feeding belts respectively connected to the at least one main feeding belt; and the molding system comprises a plurality of molding machines connected to the branch feeding belts.

2. The machining module of claim 1, wherein the second transporting section comprises a feeding strip connected to the first transporting section, and a loop transporting belt positioned at a bottom of the feeding strip.

3. The machining module of claim 2, wherein the feeding strip comprises a horizontal strip portion and a sloping strip portion extending from an end of the horizontal strip portion; the horizontal strip portion is connected to the at least one main feeding belt, and the sloping strip portion is connected to the loop transporting belt.

4. The machining module of claim 3, wherein the sloping strip portion forms a plurality of friction bars.

5. The machining module of claim 1, wherein the transporting system further forms a wiping station for wiping the blank members.

6. The machining module of claim 2, wherein the second transporting section further comprises a support frame positioned on the loop transporting belt.

7. The machining module of claim 1, wherein the painting system comprises a painting workshop, and a feeding line extending out of the painting workshop.

8. A machining module, comprising:
a molding system;
a painting system, and
a transporting system positioned between the molding system and the painting system;
wherein the transporting system transports a plurality of blank members produced by the molding system, the transporting system defines a detecting station for detecting the blank members, the transporting system comprises a first transporting section connected to the molding system and a second transporting section positioned adjacent to the painting system, the first transporting section comprises at least one main feeding belt and a plurality of branch feeding belts respectively connected to the at least one main feeding belt; and the molding system comprises a plurality of molding machines connected to the branch feeding belts.

9. The machining module of claim 8, wherein the second transporting section comprises a feeding strip connected to the first transporting section, and a loop transporting belt positioned at a bottom of the feeding strip.

10. The machining module of claim 9, wherein the feeding strip comprises a horizontal strip portion and a sloping strip portion extending from an end of the horizontal strip portion; the horizontal strip portion is connected to the at least one main feeding belt, and the sloping strip portion is connected to the loop transporting belt.

11. The machining module of claim 10, wherein the sloping strip portion forms a plurality of friction bars.

12. The machining module of claim 8, wherein the transporting system further forms a wiping station for wiping the blank members.

13. The machining module of claim 9, wherein the second transporting section further comprises a support frame positioned on the loop transporting belt.

14. The machining module of claim 8, wherein the painting system comprises a painting workshop, and a feeding line extending out of the painting workshop.

* * * * *